US012632932B2

(12) United States Patent
Ahn et al.

(10) Patent No.: US 12,632,932 B2
(45) Date of Patent: May 19, 2026

(54) IMAGE PROCESSING DEVICE AND OPERATION METHOD THEREOF

(71) Applicant: SAMSUNG ELECTRONICS CO., LTD., Suwon-si (KR)

(72) Inventors: Iljun Ahn, Suwon-si (KR); Tammy Lee, Suwon-si (KR); Soomin Kang, Suwon-si (KR); Jaeyeon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 560 days.

(21) Appl. No.: 17/987,574

(22) Filed: Nov. 15, 2022

(65) Prior Publication Data

US 2023/0071417 A1     Mar. 9, 2023

Related U.S. Application Data

(63) Continuation of application No. PCT/KR2021/005888, filed on May 11, 2021.

(30) Foreign Application Priority Data

May 15, 2020    (KR) ........................ 10-2020-0058333
Nov. 24, 2020    (KR) ........................ 10-2020-0159100

(51) Int. Cl.
*G06T 5/70*        (2024.01)
*G06T 5/50*        (2006.01)

(52) U.S. Cl.
CPC .................. *G06T 5/70* (2024.01); *G06T 5/50* (2013.01); *G06T 2207/20021* (2013.01); *G06T 2207/20084* (2013.01)

(58) Field of Classification Search
CPC ............ G06T 2207/20021; G06T 5/60; G06N 3/0464; G06N 3/02; H04N 19/86; G06V 10/82
See application file for complete search history.

(56) References Cited

U.S. PATENT DOCUMENTS 8,681,867 B2    3/2014   Teng et al.
9,251,575 B2    2/2016   Tanaka
(Continued)

FOREIGN PATENT DOCUMENTS

JP        2014-126903 A      7/2014
JP        2020-47271 A       3/2020
(Continued)

OTHER PUBLICATIONS

L. Galteri, L. Seidenari, M. Bertini and A. D. Bimbo, "Deep Universal Generative Adversarial Compression Artifact Removal," in IEEE Transactions on Multimedia, vol. 21, No. 8, pp. 2131-2145, Aug. 2019, doi: 10.1109/TMM.2019.2895280. (Year: 2019).*
(Continued)

*Primary Examiner* — Emily C Terrell
*Assistant Examiner* — Jacqueline R Zak
(74) *Attorney, Agent, or Firm* — Sughrue Mion, PLLC

(57)        ABSTRACT

An image processing apparatus includes a memory storing at least one instruction; and a processor configured to execute the at least one instruction to use at least one neural network to: extract n pieces of first feature information from a first image, based on locations of pixels included in the first image, wherein n is a positive integer, generate n pieces of second feature information by performing a convolution operation between each of the n pieces of the first feature information and each of n kernels, and generate, based on the n pieces of the second feature information, a second image from which compression artifacts included in the first image are removed.

18 Claims, 11 Drawing Sheets

(56) References Cited

U.S. PATENT DOCUMENTS

| | | | |
|---|---|---|---|
| 9,264,635 B2 | 2/2016 | Taguchi et al. | |
| 10,083,499 B1 | 9/2018 | Milanfar et al. | |
| 10,282,864 B1 | 5/2019 | Kim et al. | |
| 10,740,865 B2 | 8/2020 | Lee et al. | |
| 2006/0115002 A1 | 6/2006 | Kim et al. | |
| 2010/0014596 A1 | 1/2010 | Bruton et al. | |
| 2010/0238354 A1 | 9/2010 | Shmueli et al. | |
| 2019/0156185 A1 | 5/2019 | Li et al. | |
| 2019/0258907 A1 | 8/2019 | Rezende et al. | |
| 2019/0333190 A1* | 10/2019 | Schroers | G06T 5/60 |
| 2020/0065646 A1* | 2/2020 | Mahmoud | G06F 7/533 |
| 2020/0143228 A1 | 5/2020 | Lee et al. | |

FOREIGN PATENT DOCUMENTS

| | | | |
|---|---|---|---|
| KR | 10-2006-0060919 A | 6/2006 | |
| KR | 10-2011-0038142 A | 4/2011 | |
| KR | 10-1035138 B1 | 5/2011 | |
| KR | 10-2018-0136720 A | 12/2018 | |
| KR | 10-2019-0058366 A | 5/2019 | |
| KR | 10-2020-0015095 A | 2/2020 | |
| KR | 10-2020-0051395 A | 5/2020 | |

OTHER PUBLICATIONS

T. D. Denemark, M. Boroumand and J. Fridrich, "Steganalysis Features for Content-Adaptive JPEG Steganography," in IEEE Transactions on Information Forensics and Security, vol. 11, No. 8, pp. 1736-1746, Aug. 2016. (Year: 2016).*

Communication dated Oct. 11, 2023 issued by the Korean Intellectual Property Office in Korean Application No. 10-2020-0036146.

International Search Report (PCT/ISA/220 and PCT/ISA/210) and Written Opinion (PCT/ISA/237) issued Aug. 12, 2021 by the International Searching Authority in International Application No. PCT/KR2021/005888.

Dabov et al., "Image denoising by sparse 3D transform-domain collaborative filtering", IEEE Transactions on Image Processing, vol. 16, No. 8, Aug. 2007, (16 total pages).

Dong et al., "Compression Artifacts Reduction by a Deep Convolutional Network", arXiv:1504.06993v1 [cs.CV], Apr. 27, 2015, (9 total pages).

Zhang et al., "Beyond a Gaussian Denoiser: Residual Learning of Deep CNN for Image Denoising", arXiv:1608.03981v1 [cs.CV], Aug. 13, 2016, (13 pages total).

Office Action issued Sep. 11, 2025 by the Korean Intellectual Property Office in Korean Patent Application No. 10-2020-0159100.

* cited by examiner

FIG. 6

IMAGE PROCESSING DEVICE AND OPERATION METHOD THEREOF

CROSS-REFERENCE TO RELATED APPLICATIONS

This application is a by-pass continuation application of International Application No. PCT/KR2021/005888, filed on May 11, 2021, which based on and claims priority to Korean Patent Application No. 10-2020-0159100, filed on Nov. 24, 2020, and Korean Patent Application No. 10-2020-0058333, filed on May 15, 2020, in the Korean Intellectual Property Office, the disclosures of which are incorporated by reference herein in their entireties.

BACKGROUND

1. Field

The disclosure relates to an image processing apparatus for removing artifacts of an image by using a neural network, and an operating method of the image processing apparatus.

2. Description of Related Art

As data traffic increases exponentially with the development of computer technology, artificial intelligence has become important for leading future innovation. Artificial intelligence is a method that mimics human thinking, and is thus limitlessly applicable to virtually all industries. Representative technologies of artificial intelligence include pattern recognition, machine learning, expert systems, neural networks, and natural language processing.

A neural network models the characteristics of human biological nerve cells by using mathematical expressions, and uses an algorithm that mimics a human's learning ability. Through this algorithm, a neural network is able to generate mapping between input data and output data, and the ability to generate such mapping may be expressed as the learning ability of the neural network. In addition, the neural network has a generalization ability to generate correct output data with respect to input data that has not been used for learning, based on a learning result.

In related art convolutional neural networks (CNNs), it is common to use the same kernel for all pixels in an input image. Accordingly, when an image is processed by using an existing CNN, compression artifacts (e.g., blocking artifacts or ringing artifacts) occurring at a block boundary may not be effectively removed.

Also, a method of removing artifacts by using different filters according to rules at a block boundary is difficult to implement by using a CNN and is not suitable for parallel processing.

SUMMARY

Provided are an image processing apparatus in which compression artifacts may be effectively reduced by using a convolutional neural network (CNN), and an operating method of the image processing apparatus.

According to an aspect of the disclosure, an image processing apparatus includes: a memory storing at least one instruction; and a processor configured to execute the at least one instruction to use at least one neural network to: extract n pieces of first feature information from a first image, based on locations of pixels included in the first image, wherein n is a positive integer, generate n pieces of second feature information by performing a convolution operation between each of the n pieces of the first feature information and each of n kernels, and generate, based on the n pieces of the second feature information, a second image from which compression artifacts included in the first image are removed.

The processor may be further configured to execute the at least one instruction to use the at least one neural network to extract the n pieces of the first feature information by dividing the first image into blocks having a preset size and sampling pixels having a same location in the blocks as a same group.

Each of the blocks includes n pixels, and n may be determined based on the preset size of the blocks.

The processor may be further configured to execute the at least one instruction to use the at least one neural network to: divide the second image into blocks having the preset size, and determine pixel values included in one piece of the second feature information, among the n pieces of the second feature information, as pixel values of a same location in the blocks.

The processor may be further configured to execute the at least one instruction to use the at least one neural network to extract the n pieces of first feature information, by performing a convolution operation between the first image and a second kernel, by applying a stride size.

A number n of the pieces of first feature information may be determined based on the stride size.

Then kernels may be different from each other.

A size of the first image and a size of the second image may be the same.

According to an aspect of the disclosure, an operating method of an image processing apparatus for performing image processing by using at least one neural network, includes: extracting n pieces of first feature information from a first image, based on locations of pixels included in the first image, wherein n is a positive integer; generating n pieces of second feature information, by performing a convolution operation between each of the n pieces of the first feature information and each of n kernels; and generating, based on the n pieces of the second feature information, a second image from which compression artifacts included in the first image are removed.

The extracting the n pieces of the first feature information may include extracting the n pieces of the first feature information by dividing the first image into blocks having a preset size and sampling pixels having a same location in the blocks as a same group.

Each of the blocks may include n pixels, and n may be determined based on the preset size of the blocks.

The generating the second image may include: dividing the second image into blocks having the preset size; and determining pixels included in one piece of the second feature information, among the n pieces of the second feature information, as pixel values of a same location in the blocks.

The extracting the n pieces of the first feature information may include extracting the n pieces of the first feature information, by performing a convolution operation between the first image and a second kernel, by applying a stride size.

A number n of the pieces of the first feature information may be determined based on the stride size.

According to an aspect of the disclosure, a computer program product includes a non-transitory computer-readable recording medium having recorded thereon a program for executing an operating method of an image processing apparatus for performing image processing by using at least one neural network, the operating method including: extracting n pieces of first feature information from a first image, based on locations of pixels included in the first image, wherein n is a positive integer; generating n pieces of second feature information, by performing a convolution operation between each of the n pieces of the first feature information and each of n kernels; and generating, based on the n pieces of the second feature information, a second image from which compression artifacts included in the first image are removed.

The extracting the n pieces of the first feature information may include extracting the n pieces of the first feature information by dividing the first image into blocks having a preset size and sampling pixels having a same location in the blocks as a same group.

Each of the blocks may include n pixels, and n may be determined based on the preset size of the blocks.

The generating the second image may include: dividing the second image into blocks having the preset size; and determining pixels included in one piece of the second feature information, among the n pieces of the second feature information, as pixel values of a same location in the blocks.

The extracting the n pieces of the first feature information may include extracting the n pieces of the first feature information, by performing a convolution operation between the first image and a second kernel, by applying a stride size.

A number n of the pieces of the first feature information may be determined based on the stride size.

An image processing apparatus according to one or more embodiments may primarily extract pieces of feature information by grouping pixels having similar characteristics based on locations of pixels in a block, included in an image, and may effectively remove compression artifacts by performing convolution by applying different kernels to the extracted pieces of feature information.

Further, an image processing apparatus according to one or more embodiments may perform image processing for removing compression artifacts in parallel, by using an artifact removal network.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a reference diagram for describing an operation of a pixel synthesizing unit, according to an embodiment;

DETAILED DESCRIPTION

Figure 1:
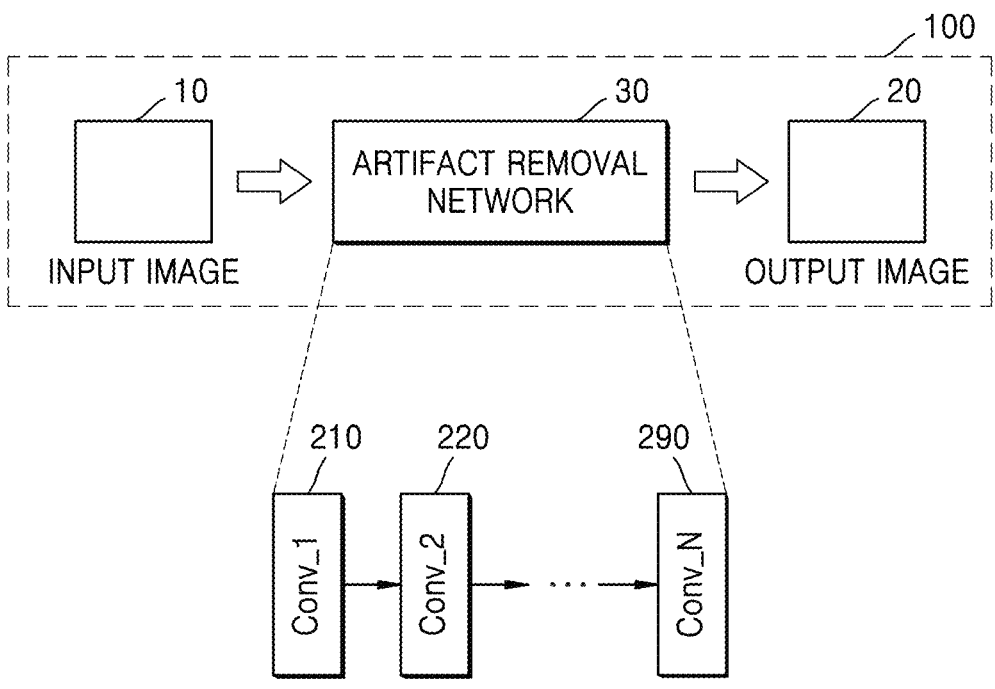
FIG. 1 is a diagram illustrating a method by which an image processing apparatus processes an image by using an artifact removal network, according to an embodiment.

The terms used herein will be briefly described, and the present disclosure will be described in detail.

The terms used herein are those general terms currently widely used in the art in consideration of functions in the disclosure but the terms may vary according to the intention of one of ordinary skill in the art, precedents, or new technology in the art. Also, some of the terms used herein may be arbitrarily chosen by the present applicant, and in this case, these terms are defined in detail below. Accordingly, the specific terms used herein should be defined based on the unique meanings thereof and the whole context of the disclosure.

It will be understood that when a certain part "comprises" or "includes" a certain component, the part does not exclude another component but may further include another component, unless the context clearly dictates otherwise. Also, the term such as " . . . unit" or " . . . module" refers to a unit that performs at least one function or operation, and the unit may be implemented as hardware or software or as a combination of hardware and software.

The disclosure will now be described more fully with reference to the accompanying drawings. However, the disclosure may be embodied in many different forms and is not limited to the embodiments of the disclosure set forth herein. For clarity, portions irrelevant to the descriptions of the disclosure are omitted in the drawings, and like components are denoted by like reference numerals throughout the specification.

FIG. 1 is a diagram illustrating a method by which an image processing apparatus processes an image by using an artifact removal network, according to an embodiment.

Referring to FIG. 1, an artifact removal network 30 according to an embodiment may receive an input image 10, may process the input image 10, and may generate an output image 20.

The input image 10 according to an embodiment may include compression artifacts. Compression artifacts are artifacts that occur in a process of compressing an image and may include blocking artifacts and ringing artifacts. In general, compression artifacts occur in a process of compressing and decompressing an image or a video.

Image or video compression may be performed in units of blocks by dividing an image or a video into a plurality of blocks so that one block includes a certain number of pixels of the image or the video. Accordingly, compression artifacts mainly occur at a block boundary and occur with a certain period.

An image processing apparatus 100 according to an embodiment may generate the output image 20 from which artifacts are removed, by processing the input image 10 by using the artifact removal network 30.

The artifact removal network 30 according to an embodiment may include one or more convolution layers (e.g., first to $N^{th}$ convolution layers 210, 220, . . . , and 290), and may perform pixel sampling, a convolution operation, pixel synthesis, etc. in each of the convolution layers.

Image processing performed in each convolution layer will be described in detail with reference to the drawings.

Figure 2:
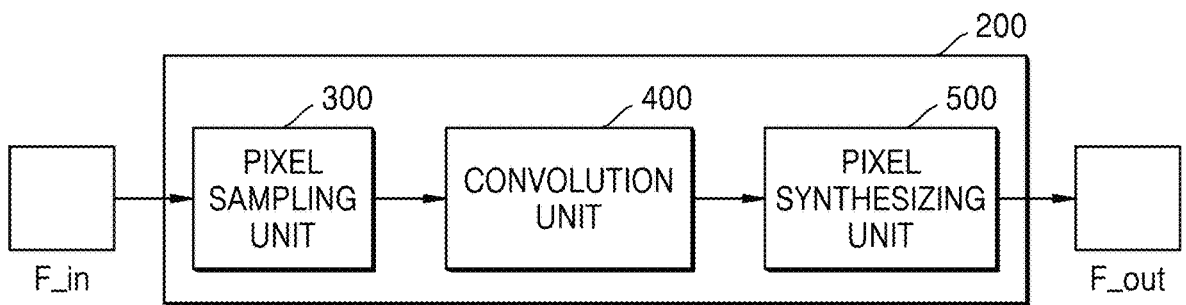
FIG. 2 is a diagram illustrating one convolution layer, according to an embodiment.

FIG. 2 is a diagram illustrating one convolution layer, according to an embodiment.

Referring to FIG. 2, one convolution layer 200 according to an embodiment may include a pixel sampling unit 300, a convolution unit 400, and a pixel synthesizing unit 500. The convolution layer 200 may be any one of the first through $N^{th}$ convolution layers 210, 220, . . . , and 290 of FIG. 1. For example, each of the first through $N^{th}$ convolution layers 210, 220, . . . , and 290 may include the pixel sampling unit 300, the convolution unit 400, and the pixel synthesizing unit 500. The convolution layer 200 according to an embodiment may include a structure of receiving a first image F_in and outputting a second image F_out. Sizes of the first image F_in and the second image F_out may be the same, but embodiments of the disclosure are not limited thereto.

Hereinafter, an operation performed in one convolution layer will be described in detail with reference to FIGS. 3 to 6.

Figure 3:
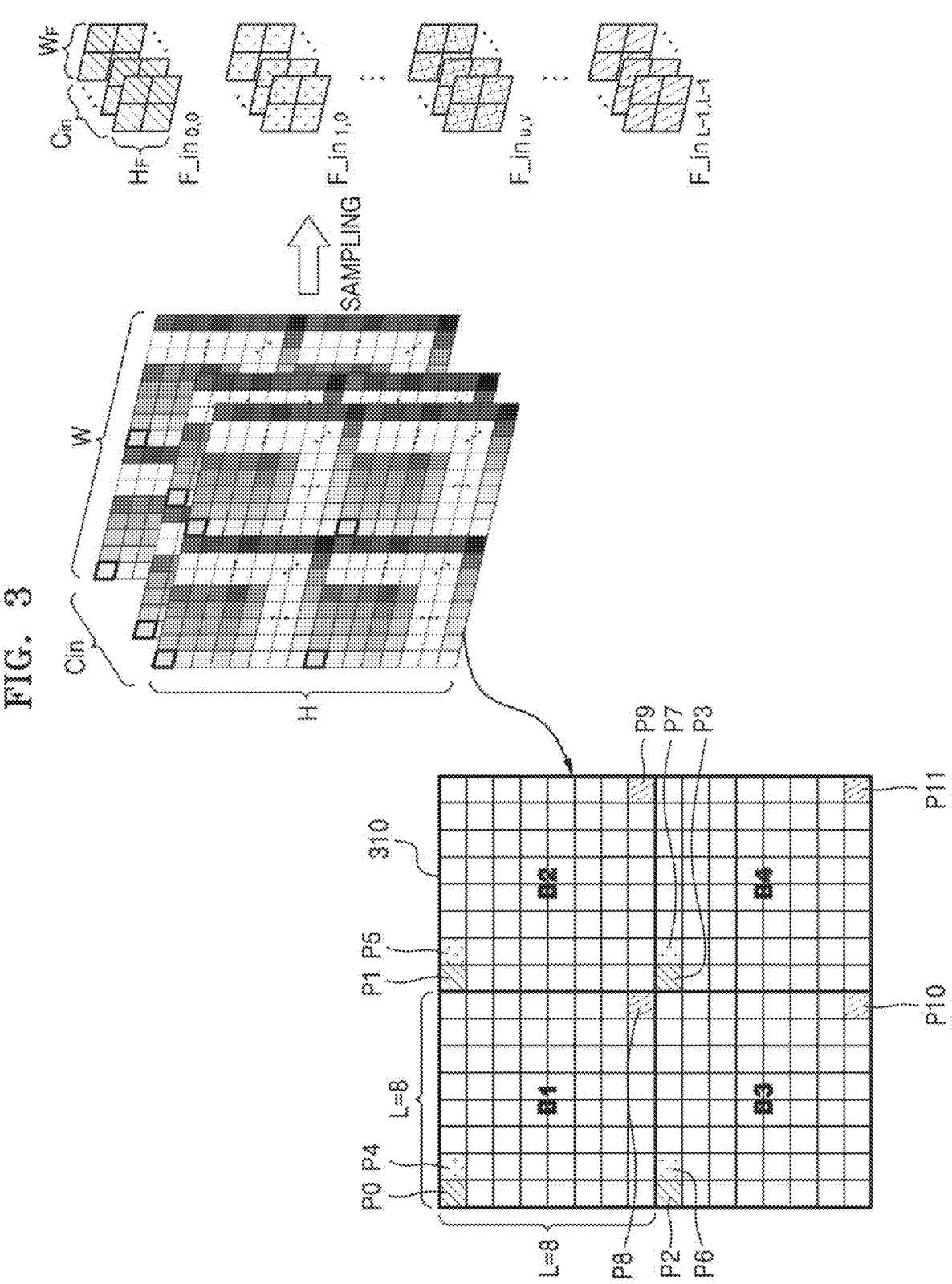
FIG. 3 is a reference diagram for describing an operation of a pixel sampling unit, according to an embodiment.

FIG. 3 is a reference diagram for describing an operation of a pixel sampling unit, according to an embodiment.

The pixel sampling unit 300 according to an embodiment may generate n sampling features, by grouping pixels, based on location information of pixels included in the first image F_in. In this case, the first image may be the input image 10 of FIG. 1 feature information output from a previous convolution layer. For example, when the current convolution layer 200 is the first convolution layer Conv_1, the first image may be the input image 10. When the current convolution layer 200 is one of the second to $N^{th}$ convolution layers Conv_2, . . . , and Conv_N, the first image F_in may be feature information output from a previous convolution layer. Alternatively, the first image may be feature information obtained by performing a certain operation or processing on the feature information output from the previous convolution layer. However, embodiments of the disclosure are not limited thereto.

The first image F_in according to an embodiment has a size of W×H×Cin, where W denotes a width of the first image F_in, H denotes a height of the first image F_in, and Cin denotes the number of channels of the first image F_in.

The pixel sampling unit 300 may generate a plurality of sampling features, by sampling pixels included in the first image with a period L in a width direction and a height direction, as shown below in Equation 1. For example, the pixel sampling unit 300 may divide the first image F_in into blocks having a preset size of L×L, and may sample pixels having the same location in the blocks in the same group.

$$F\_in_{u,v}=F\_in[u{:}L{:}W{-}1,v{:}L{:}H{-}1,0{:}1{:}C{-}1] \qquad \text{[Equation 1]}$$

In Equation 1, denotes a sampling feature, and F_in denotes the first image. F_in[ ] denotes an operation of sampling pixels in a width direction, a height direction, and a channel direction of the first image F_in. u:L:W−1 denotes sampling of pixels with the period of L from a pixel located at a point u in the width direction of the first image F_in to a pixel located at a point W−1. v:L:H−1 denotes sampling of pixels with the period of L from a pixel located at a point v in the height direction of the first image F_in to a pixel located at a point H−1. 0:1:C−1 denotes sampling of all pixels from a pixel located at a point 0 in the channel direction of the first image F_in to a pixel located at a point C−1. That is, from among pixels included in the first image F_in, pixels having the same location in the width direction and the same location in the height direction and located in different channels may be sampled as the same group.

Hereinafter, a method of generating a plurality of sampling features will be described assuming that one channel image (e.g., a first channel image 310) included in the first image F_in has a size of 16×16 and L=8.

The first image F_in may be divided into blocks having a size of 8×8, and the pixel sampling unit 300 may sample pixels having the same location in the blocks as one group. For example, when the first channel image 310 is divided into blocks having a size of 8×8, the first channel image 310 may be divided into four blocks (e.g., first, second, third, and fourth blocks B1, B2, B3, and B4). Also, when pixels included in the first channel image 310 of the first image F_in are sequentially indexed from $P_{0,0,0}$ to $P_{15,15,0}$ according to locations, $P_{0,0,0}$(P0), $P_{0,8,0}$(P1), $P_{8,0,0}$(P2), and $P_{8,8,0}$(P3) have the same location in the first, second, third, and fourth blocks B1, B2, B3, and B4. The pixel sampling unit 300 may sample $P_{0,0,0}$(P0), $P_{0,8,0}$(P1), $P_{8,0,0}$(P2), and $P_{8,8,0}$(P3) as a first group. Also, because a sampling period in the channel direction is 1, for second to $C{-}1^{th}$ channel images, like in the first channel image, pixels having the same location ($P_{0,0,1}$, $P_{0,8,1}$, $P_{8,9,1}$, $P_{8,8,1}$, . . . , and $P_{0,0,C\text{-}1}$, $P_{8,0,C\text{-}1}$, $P_{8,8,C\text{-}1}$) may be sampled as the first group. The pixel sampling unit 300 may generate a first sampling feature $F\_in_{0,0}$ based on the pixels sampled as the first group, and the first sampling feature $F\_in_{0,0}$ has a size of 2×2×C.

Also, in the same manner, in the first channel image 310, the pixel sampling unit 300 may sample $P_{1,0,0}$(P4), $P_{9,0,0}$(P5), $P_{1,8,0}$(P6), and $P_{9,8,0}$(P7) having the same location in the first, second, third, and fourth blocks B1, B2, B3, and B4 as a second group, and for the second to $C{-}1^{th}$ channel images, like in the first channel image 310, the pixel sampling unit 300 may sample pixels having the same location ($P_{1,0,1}$, $P_{9,0,1}$, $P_{1,8,1}$, $P_{9,8,1}$, . . . , and $P_{1,0,C\text{-}1}$, $P_{9,0,C\text{-}1}$, $P_{1,8,C\text{-}1}$, $P_{9,8,C\text{-}1}$) as the second group. The pixel sampling unit 300 may generate a second sampling feature $F\_in_{1,0}$ based on the pixels sampled as the second group, and the second sampling feature $F\_in_{1,0}$ has a size of 2×2×C.

Also, in the same manner, in the first channel image 310, the pixel sampling unit 300 may sample $P_{7,7,0}$(P8), $P_{7,15,0}$(P9), $P_{15,7,0}$(P10), and $P_{15,15,0}$(P11) having the same location in the first, second, third, and fourth blocks B1, B2, B3, and B4 as a $64^{th}$ group, and for the second to $C{-}1^{th}$ channel images, like in the first channel image 310, the pixel sampling unit 300 may sample pixels having the same location ($P_{7,7,1}$, $P_{7,15,1}$, $P_{15,7,1}$, $P_{15,15,1}$, . . . , and $P_{7,7,C\text{-}1}$, $P_{7,15,C\text{-}1}$, $P_{15,7,C\text{-}1}$, $P_{15,15,C\text{-}1}$) as the $64^{th}$ group. The pixel sampling unit 300 may generate a $64^{th}$ sampling feature, based on the pixels sampled as the $64^{th}$ group, and the $64^{th}$ sampling feature $F\_in_{7,7}$ has a size of 2×2×C.

Although the above has been described assuming that W=H=16 and L=8 for convenience of explanation, embodiments of the disclosure are not limited thereto. When sampling is performed by using the above method, the pixel sampling unit 300 may generate L×L sampling features (e.g., $F\_in_{0,0}$, $F\_in_{1,0}$, . . . , and $F\_in_{L\text{-}1,L\text{-}1}$), and each of the sampling features may have a size of $W_F×H_F×Cin$. In this case, $W_F$ may be determined based on the sampling period L in the width direction and the width W of the first image, and $H_F$ may be determined based on the sampling period L in the height direction and the height H of the first image.

Figure 4:
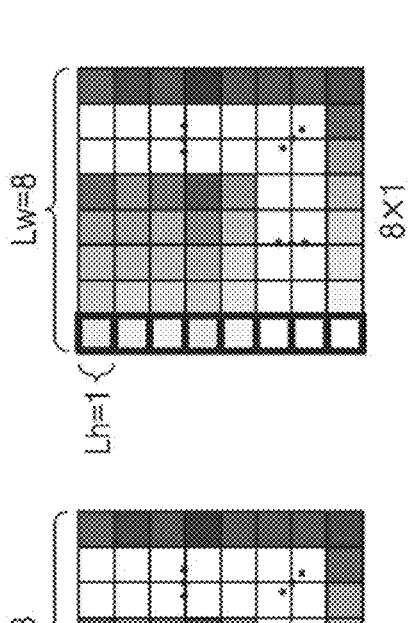
FIG. 4 is a diagram illustrating a pixel sampling period, according to an embodiment.
Figure 4:
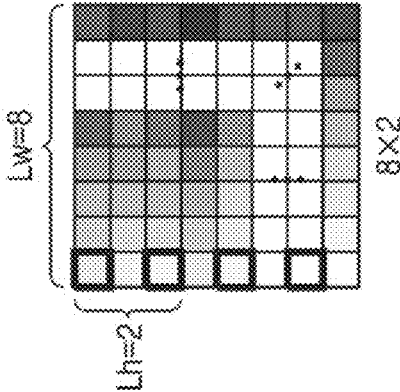
Figure 4:
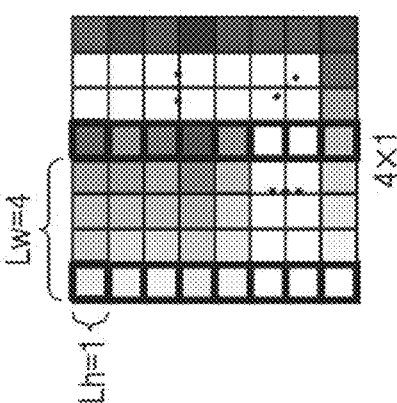
Figure 4:
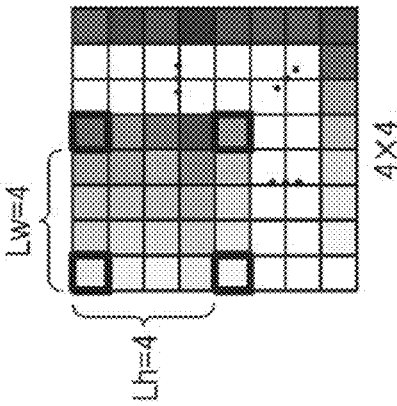

FIG. 4 is a diagram illustrating an example of a pixel sampling period, according to an embodiment.

FIG. 4 illustrates a block having a size of 8×8 included in the first image F_in, according to an embodiment.

Referring to FIG. 4, the pixel sampling unit 300 according to an embodiment may generate 4×4 sampling features (e.g., $F\_in_{0,0}$, $F\_in_{1,0}$, and $F\_in_{3,3}$) by sampling the first image $F\_in$ with a period of Lw=4 in a width direction and a period of Lh=4 in a height direction, and each of the sampling features (e.g., $F\_in_{0,0}$, $F\_in_{1,0}$, . . . , and $F\_in_{3,3}$) may have a size of W/4×H/4×Cin.

Also, the pixel sampling unit 300 may generate 4×1 sampling features (e.g., $F\_in_{0,0}$ $F\_in_{1,0}$, and $F\_in_{3,0}$), by sampling the first image $F\_in$ with a period of Lw=4 in the width direction and a period of Lh=1 in the height direction. In this case, each of the sampling features may have a size of W/4×H×Cin.

Also, the pixel sampling unit 300 may generate 8×2 sampling features (e.g., $F\_in_{0,0}$, $F\_in_{1,0}$, . . . , and $F\_in_{7,1}$), by sampling the first image $F\_in$ with a period of Lw=8 in the width direction and a period of Lh=2 in the height direction. In this case, each of the sampling features may have a size of W/8×H/2×Cin.

Also, the pixel sampling unit 300 may generate 8×1 sampling features (e.g., $F\_in_{0,0}$, $F\_in_{1,0}$, . . . , and $F\_in_{8,0}$), by sampling the first image $F\_in$ with a period of Lw=8 in the width direction and a period of Lh=1 in the height direction. In this case, each of the sampling features may have a size of W/8×H×Cin.

The pixel sampling unit 300 according to an embodiment may determine a sampling period in the width direction and the height direction, based on complexity of an image processing system, memory, whether line processing is performed, whether deinterlacing is performed, and encoding information (e.g., compression parameters). Also, the sampling period according to an embodiment is not limited to the sampling period of FIG. 4, and may include various other sampling periods.

Figure 5:
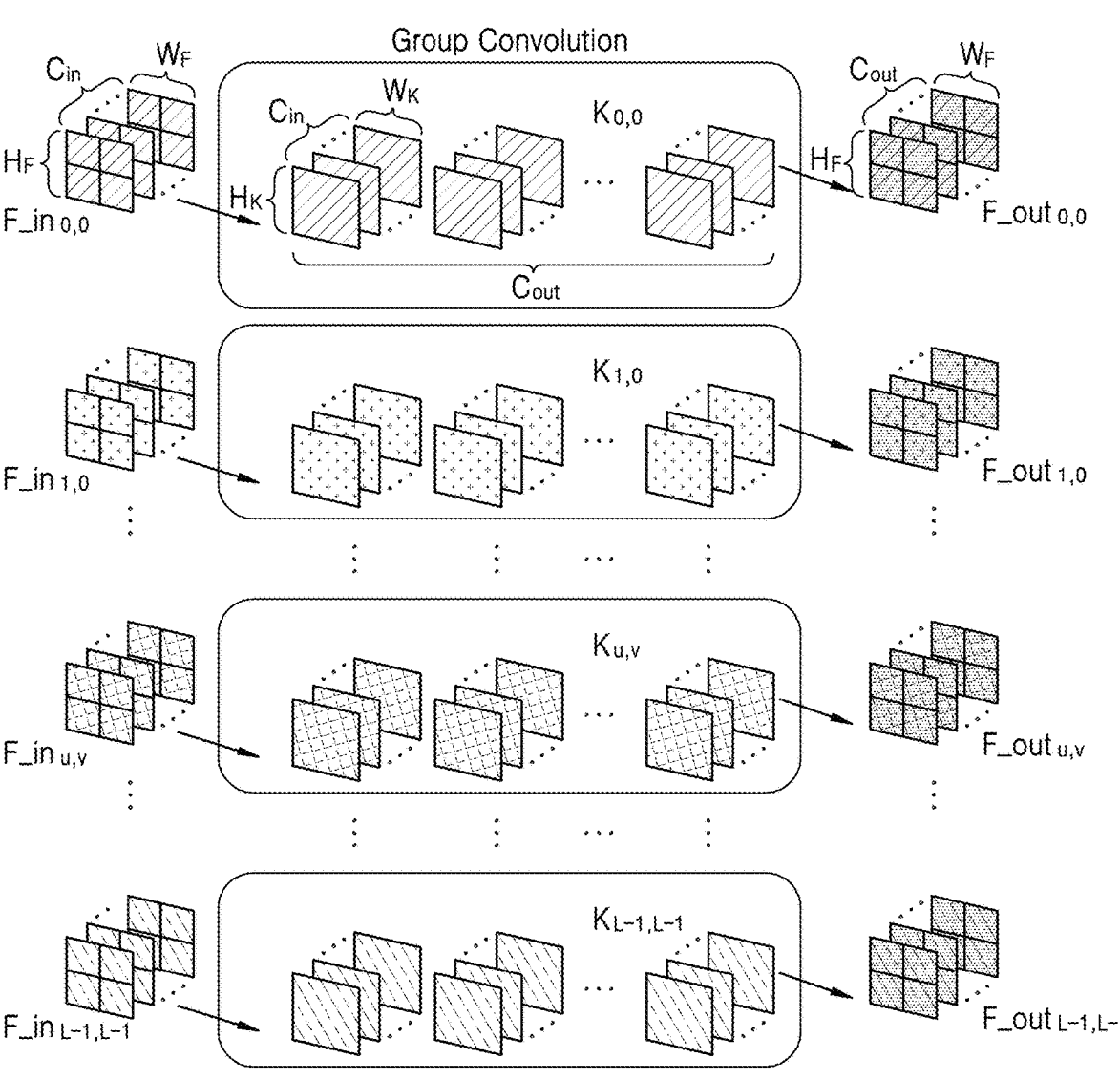
FIG. 5 is a reference diagram for describing an operation of a convolution unit, according to an embodiment.

FIG. 5 is a reference diagram for describing an operation of a convolution unit, according to an embodiment.

Referring to FIG. 5, the convolution unit 400 may perform convolution (group convolution) between each of n sampling features generated by the pixel sampling unit 300 and each of n kernels, and a convolution operation may be expressed as in Equation 2.

$$F\_out_{u,v}=\text{Conv2D}(\text{input}=F\_in_{u,v},\text{kernel}=K_{u,v},\text{stride}=1) \quad \text{[Equation 2]}$$

In Equation 2, $F\_in_{u,v}$ denotes one of the n sampling features, $K_{u,v}$ denotes a kernel corresponding to the input sampling feature, and a stride size is 1. When a stride size is 1, it means that a convolution operation is performed by moving pixels included in the input sampling feature one by one.

Referring to FIG. 5 and Equation 2, different kernels may be applied to the n sampling features. For example, the convolution unit 400 may generate a first output feature $F\_out_{0,0}$, by performing a convolution operation between the first sampling feature $F\_in_{0,0}$ and a first kernel $K_{0,0}$ by applying the first kernel $K_{0,0}$ to the first sampling feature $F\_in_{0,0}$.

Also, the first kernel $K_{0,0}$ may include Cout sub-kernels, and one sub-kernel may have a size of $W_K×H_K×Cin$. The number of channels Cin of one sub-kernel may be the same as the number of channels Cin of sampling features.

Also, the convolution unit 400 may generate a second output feature $F\_out_{1,0}$, by performing a convolution operation between the second sampling feature $F\_in_{1,0}$, and a second kernel $K_{1,0}$, by applying the second kernel $K_{1,0}$ to the second sampling feature $F\_in_{1,0}$. Also, the convolution unit 400 may generate an $n^{th}$ output feature $F\_out_{L-1,L-1}$, by performing a convolution operation between the $n^{th}$ sampling feature $F\_in_{L-1,L-1}$ and an $n^{th}$ kernel $K_{L-1,L-1}$, by applying the $n^{th}$ kernel $K_{L-1,L-1}$ to the $n^{th}$ sampling feature $F\_in_{L-1,L-1}$. Also, each of the second to $n^{th}$ kernels may include Cout sub-kernels, and one sub-kernel may have a size of $W_K×H_K×Cin$.

In this case, widths and heights of the features $F\_out_{0,0}$, $F\_out_{,0}$, . . . , and $F\_out_{L-1,L-1}$ output as a convolution operation result may be the same as sampling features, and the number of channels of the output features may be determined based on the number of sub-kernels included in one kernel. For example, when each of sampling features according to an embodiment has a size of $W_F×H_F×Cin$ and the number of sub-kernels included in one kernel is Cout, each of output n features may have a size of $W_F×H_F×Cout$.

N sampling features according to an embodiment are features sampled for each location in a block of pixels, and one sampling feature is information sampled among pixels having a similar probability of artifacts. Also, as described with reference to FIG. 5, because different kernels are applied to n sampling features, different kernels are applied according to a probability of artifacts. Accordingly, compression artifacts mainly occurring at a block boundary may be effectively removed.

Figure 6:
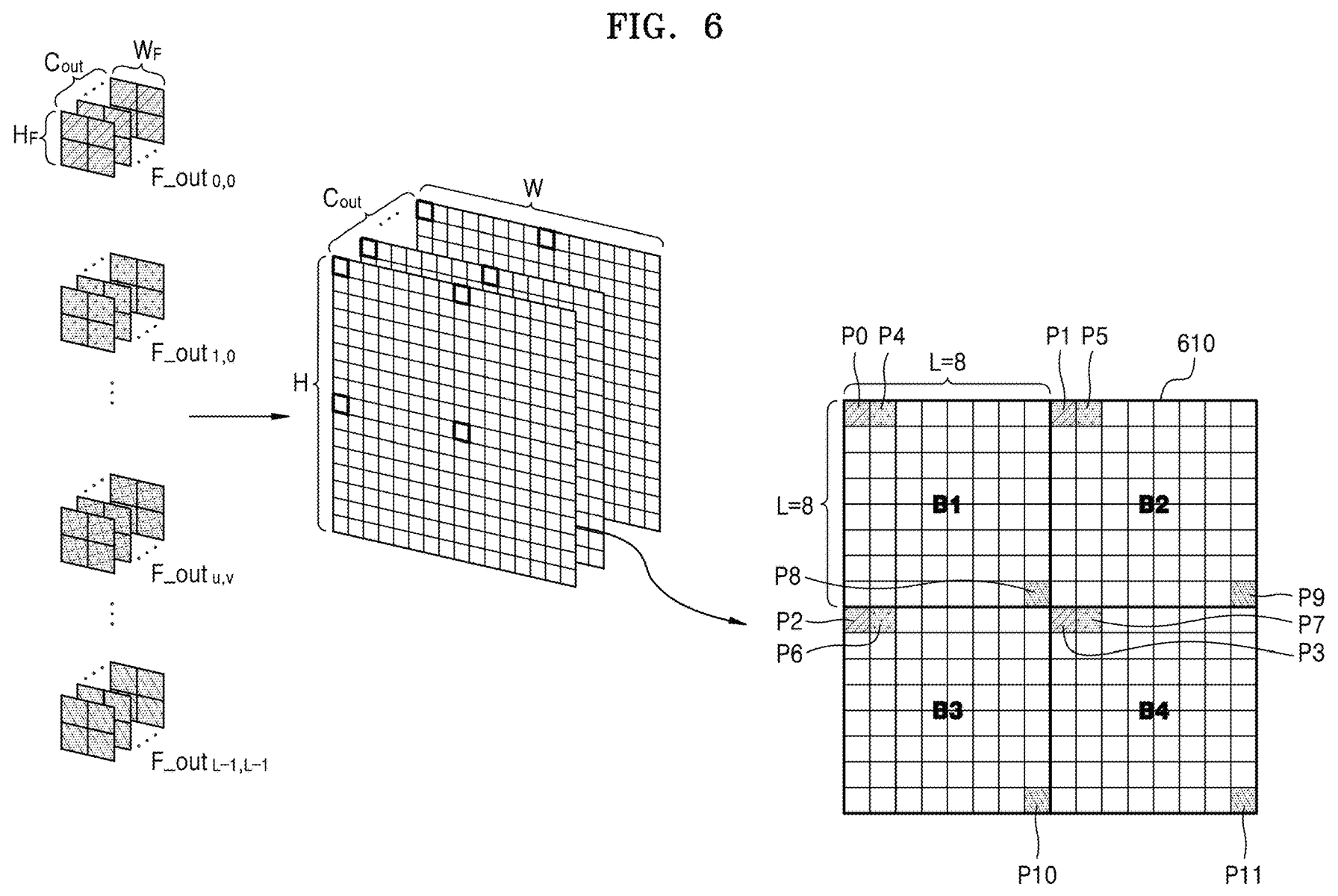

FIG. 6 is a reference diagram for describing an operation of a pixel synthesizing unit, according to an embodiment.

Referring to FIG. 6, the pixel synthesizing unit 500 may generate the second image $F\_out$, by synthesizing the n features $F\_out_{0,0}$, $F\_out_{1,0}$, . . . , and $F\_out_{L-1,L-1}$ output from the convolution unit 400. In this case, a width and a height of the second image $F\_out$ may be the same as a width and a height of the first image $F\_in$, and the number of channels of the second image $F\_out$ may be determined to be the same as a number of channels Cout of each of the n features $F\_out_{0,0}$, $F\_out_{1,0}$, . . . , and $F\_out_{L-1,L-1}$ output from the convolution unit 400.

The pixel synthesizing unit 500 may generate the second image $F\_out$, based on a period with which the pixel sampling unit 300 samples pixels. As shown in Equation 3, the pixel synthesizing unit 500 may generate the second image $F\_out$, based on the n features $F\_out_{0,0}$, $F\_out_{1,0}$, . . . , and $F\_out_{L-1,L-1}$ output from the convolution unit 400.

$$F\_out[u:L:W-1,v:L:H-1,0:1:Cout-1]=F\_out_{u,v} \quad \text{[Equation 3]}$$

For example, when the pixel sampling unit 300 samples the first image $F\_in$ with a period of L in a width direction and a period of L in a height direction, the pixel synthesizing unit 500 may divide the second image $F\_out$ into blocks having a size of L×L, and may determine pixel values included in the output features $F\_out_{0,0}$, $F\_out_{1,0}$, . . . , and $F\_out_{L-1,L-1}$ as pixel values of pixels having the same location in the blocks.

For convenience of explanation, in the following description, it will be assumed that each of the output features $F\_out_{0,0}$, $F\_out_{1,0}$, . . . , and $F\_out_{L-1,L-1}$ has a size of 2×2×Cout, the second image has a size of 16×16×Cout, and L=8.

In this case, methods of synthesizing features in channels are the same, and thus, one channel image will be described. Referring to FIG. 6, first channel images $F\_out_{0,0,0}$, $F\_out_{1,0,0}$, . . . , $F\_out_{L-1,L-1,0}$ included in the first to $n^{th}$ output features $F\_out_{0,0}$, $F\_out_{1,0}$, . . . , and $F\_out_{L-1,L-1}$ have a size of 2×2, and a first channel image 610 included in the second image $F\_out$ has a size of 16×16. Also, because L=8, the first channel image 610 of the second image $F\_out$ may be divided into blocks (e.g., first, second, third, and fourth blocks) having a size of 8×8.

The pixel synthesizing unit 500 may determine pixel values included in the first channel image $F\_out_{0,0,0}$ of the first output feature $F\_out_{0,0}$ as pixel values of pixels P0, P1, P2, and P3 having a location of (0, 0) in the first, second, third, and fourth blocks B1, B2, B3, and B4 included in the first channel image 610 of the second image F_out. Also, the pixel synthesizing unit 500 may determine pixel values included in the first channel image $F\_out_{1,0,0}$ of the second output feature $F\_out_{1,0}$ as pixel values of pixels P4, P5, P6, and P7 having a location of (0, 1) in the first, second, third, and fourth blocks B1, B2, B3, and B4 of the first channel image 610. Also, the pixel synthesizing unit 500 may determine pixel values included in the first channel image $F\_out_{L-1,L-1,0}$ of the $n^{th}$ output feature $F\_out_{L-1,L-1}$ as pixel values of pixels P8, P9, P10, and P11 having a location of (7, 7) in the first, second, third, and fourth blocks B1, B2, B3, and B4 of the first channel image 610. As such, the pixel synthesizing unit 500 may generate the first channel image 610 of the second image F_out, by using pixel values of the first channel images $F\_out_{0,0,0}$, $F\_out_{1,0,0}$, . . . , and $F\_out_{L-1,L-1,0}$ respectively included in the first to $n^{th}$ output features $F\_out_{0,0}$, $F\_out_{1,0}$, . . . , and $F\_out_{L-1,L-1}$. Also, in the same manner, the pixel synthesizing unit 500 may generate second to $Cout^{th}$ channel images of the second image F_out.

At least one of the pixel sampling unit 300, the convolution unit 400, and the pixel synthesizing unit 500 described with reference to FIGS. 2 to 6 may be implemented as a hardware chip and may be loaded into the image processing apparatus 100 For example, at least one of the pixel sampling unit 300, the convolution unit 400, and the pixel synthesizing unit 500 may be implemented as a dedicated hardware chip for artificial intelligence (AI), or may be implemented as a part of a general-purpose processor (e.g., a central processing unit (CPU) or an application processor) or a graphics processor (e.g., a graphics processing unit (GPU) and may be loaded into the image processing apparatus 100 according to an embodiment.

Also, at least one of the pixel sampling unit 300, the convolution unit 400, and the pixel synthesizing unit 500 may be implemented as a software module. When at least one of the pixel sampling unit 300, the convolution unit 400, and the pixel synthesizing unit 500 is implemented as a software module (or a program module including instructions), the software module may be stored in a non-transitory computer-readable medium. Also, in this case, at least one software module may be provided by an operating system (OS) or a certain application. Alternatively, a part of at least one software module may be provided by an OS, and the remaining part may be provided by a certain application.

Figure 7:
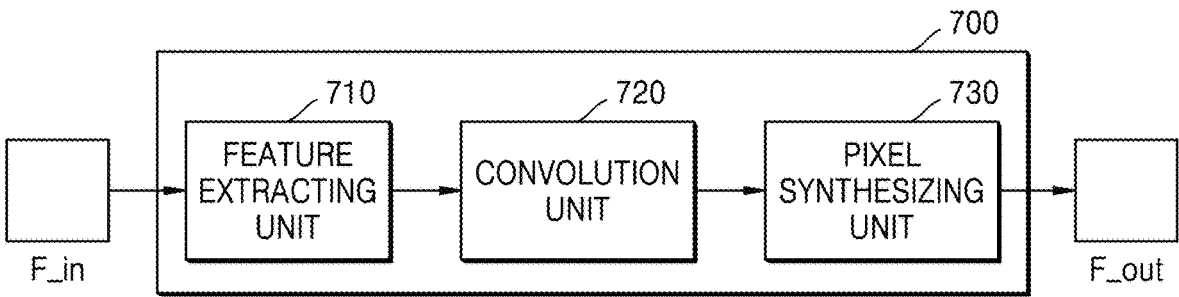
FIG. 7 is a diagram illustrating one convolution layer of FIG. 1, according to another embodiment.

FIG. 7 is a diagram illustrating one convolution layer of FIG. 1, according to an embodiment.

Referring to FIG. 7, a convolution layer 700 according to another embodiment may include a feature extracting unit 710, a convolution unit 720, and a pixel synthesizing unit 730. The convolution unit 720 and the pixel synthesizing unit 730 of FIG. 7 are respectively the same as the convolution unit 400 and the pixel synthesizing unit 500 of FIG. 2, and thus, a detailed description will be omitted.

Also, the convolution layer 700 of FIG. 7 may be any one of the first to $N^{th}$ convolution layers 210, 220, . . . , and 290.

An operation performed in the convolution layer of FIG. 7 will be described in detail with reference to FIGS. 8 and 9.

Figure 8:
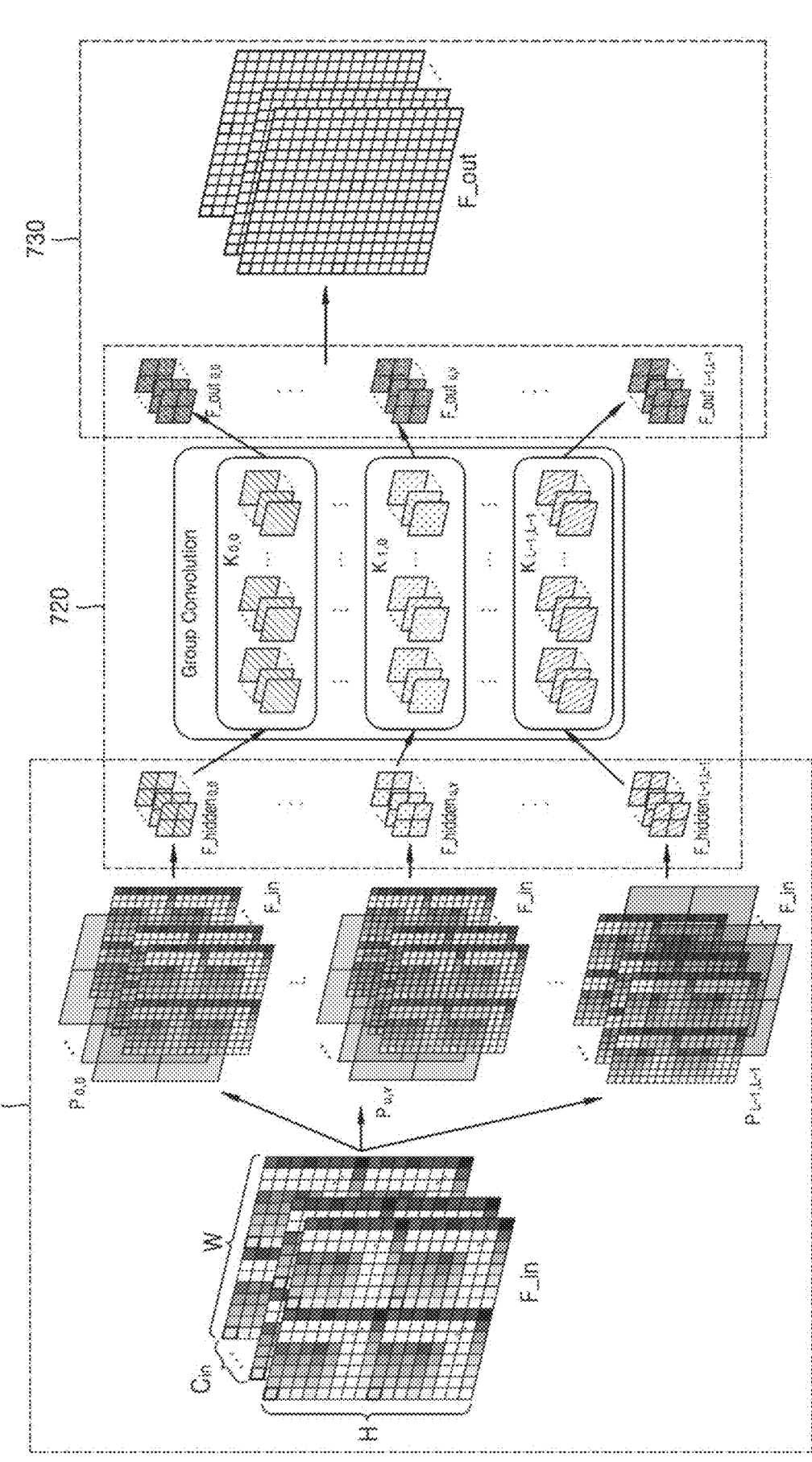
FIG. 8 is a reference diagram for describing an operation performed in the convolution layer of FIG. 7.

FIG. 8 is a reference diagram for describing an operation performed in the convolution layer of FIG. 7.

Referring to FIG. 8, the feature extracting unit 710 according to an embodiment may generate n hidden features, by performing convolution between a first image F_in and kernels $P_{0,0}$, $P_{1,0}$, . . . , and $P_{L-1,L-1}$.

The first image F_in according to an embodiment has a size of W×H×Cin. In this case, W denotes a width of the first image F_in, H denotes a height of the first image F_in, and Cin denotes the number of channels of the first image F_in.

The feature extracting unit 710 may perform a convolution operation between the first image F_in and the kernels $P_{0,0}$, $P_{1,0}$, . . . , and $P_{L-1,L-1}$, as shown in Equation 4.

$$F\_hidden_{u,v}=\text{Conv2D}(\text{input}=F\_in[n{:}1{:}W{-}1,v{:}1{:}H{-}1, \\ 0{:}1{:}Cin{-}1],\text{kernel}=Pu,v,\text{stride}=L) \qquad \text{[Equation 4]}$$

In Equation 4, $F\_hidden_{u,v}$ denotes a hidden feature extracted through a convolution operation, and Conv2D (input, kernel, stride=L) indicates that a convolution operation is performed between an input and a kernel with a stride size of L. In this case, F_in denotes the first image, and F_in[ ] denotes an operation of sampling pixels to be included in an input image (input) from among pixels included in the first image F_in. u:1:W−1 denotes sampling by moving pixels one by one from a pixel located at a point u in a width direction of the first image F_in to a pixel located at a point W−1, and all pixels from the pixel located at the point u in the width direction of the first image F_in to the pixel located at the point W−1 are included in the input image.

Also, v:1:H−1 denotes sampling by moving pixels one by one from a pixel located at a position v in a height direction of the first image F_in to a point H−1, and all pixels from the pixel located at the position v in the height direction of the first image F_in to the pixel located at the point H−1 are included in the input image. Also, 0:1:C−1 denotes sampling all pixels from a pixel located at a point 0 in a channel direction of the first image to a pixel located at a point C−1.

When the feature extracting unit 710 performs a convolution operation between an input image and a kernel, data (pixel value) subject to the convolution operation in the input image may be scanned while moving by a stride size. For example, when the stride size is L, the feature extracting unit 710 may perform a convolution operation with a kernel by moving data by L pixels in the input image.

A method by which the feature extracting unit 710 generates a hidden feature by performing a convolution operation will be described in detail with reference to FIG. 9.

Figure 9:
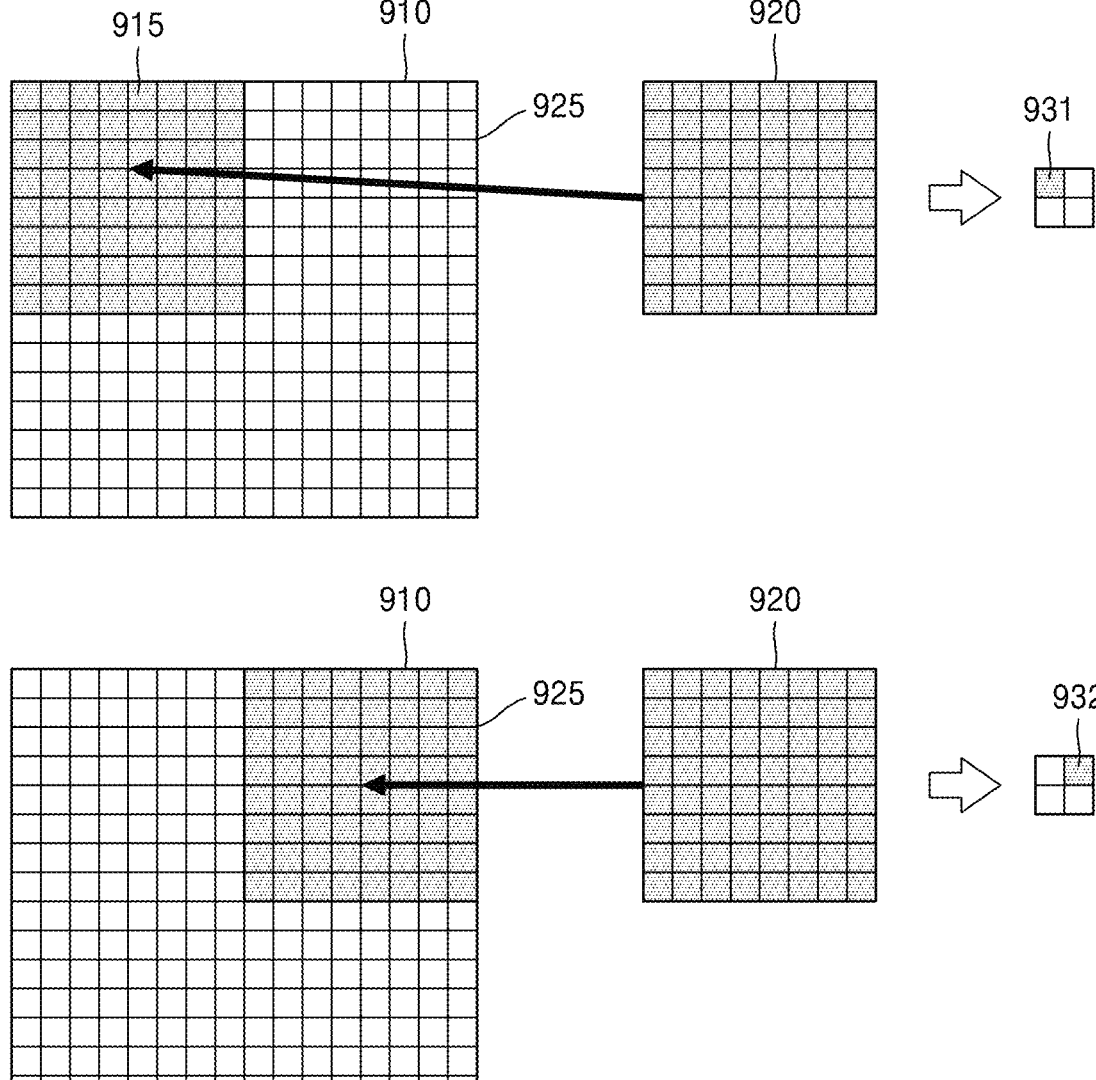
FIG. 9 is a reference diagram for describing an operation by which a feature extracting unit performs a convolution operation, according to an embodiment.

FIG. 9 is a reference diagram for describing an operation by which a feature extracting unit performs a convolution operation, according to an embodiment.

In FIG. 9, for convenience of explanation, a method of generating a plurality of hidden features when one channel image included in the first image F_in has a size of 16×16 and L=8 will be described.

Referring to FIG. 9, input data 910 represents a first channel image of the first image F_in, and the feature extracting unit 710 may perform a convolution operation by applying a kernel 920 ($P_{0,0}$) to pixels included in an upper left 8×8 area 915 of the input data 910. That is, the feature extracting unit 710 may generate one pixel value 931 mapped to the upper left 8×8 area, by multiplying and adding pixel values included in the upper left 8×8 area 915 and weight values included in the kernel 920.

Also, the feature extracting unit 710 may generate one pixel value 932 mapped to a 8×8 area 925, by multiplying and adding pixel values included in the 8×8 area 925 moved by 8 pixels in a width direction (rightward) from the upper left 8×8 area 915 and weight values included in the kernel 920.

In the same manner, the feature extracting unit 710 may generate pixel values (e.g., a third pixel value and a fourth pixel value), by multiplying and adding weight values included in the kernel 920, while moving a target of a convolution operation in the input data 910 from left to right (in the width direction) and from top to bottom (in a height direction) by 8 pixels. Accordingly, 2×2 hidden features F_hidden$_{0,0,0}$ may be output, in response to the input data 910.

Although only one channel image of the first image F_in has been described with reference to FIG. 9 for convenience of explanation, convolution may be performed on each of other channel images in the same manner as that described with reference to FIG. 9.

Also, although W=H=16 and L=8 in FIG. 9 for convenience of explanation, embodiments of the disclosure are not limited thereto. When a convolution operation is performed by using a method described with reference to FIG. 9, L×L hidden features F_hidden$_{0,0}$, F_hidden$_{1,0}$, . . . , and F_hidden$_{L-1,L-1}$ may be generated, and each of the hidden features may have a size of W$_F$×H$_F$×Cin. In this case, W$_F$ may be determined based on the width W of the first image and the stride size L in the width direction, and H$_F$ may be determined based on the height H of the first image and the stride size L in the height direction.

The hidden features F_hidden$_{0,0}$, F_hidden$_{1,0}$, . . . , and F_hidden$_{L-1,L-1}$ according to an embodiment may be features generated by performing a convolution operation between the first image F_in and kernels P$_{0,0}$, P$_{1,0}$, . . . , and P$_{L-1,L-1}$, and may be information reflecting features of pixels around a target pixel.

Referring back to FIG. 8, the convolution unit 720 may perform convolution between then hidden features F_hidden$_{0,0}$, F_hidden$_{1,0}$, . . . , and F_hidden$_{L-1,L-1}$ generated by the feature extracting unit 710 and kernels, and a convolution operation may be expressed as in Equation 5.

$$F\_out_{u,v}=Conv2D(input=F\_hidden_{u,v},kernel=K_{u,v}, \quad stride=1) \qquad \text{[Equation 5]}$$

In Equation 5, F_hidden$_{u,v}$ denotes one of the n hidden features, K$_{u,v}$ denotes a kernel corresponding to an input hidden feature, and a stride size is 1.

For example, the convolution unit 720 may generate a first output feature F_out$_{0,0}$, by performing a convolution operation between the first hidden feature F_hidden$_{0,0}$ and a first kernel K$_{0,0}$ by applying the first kernel K$_{0,0}$ to the first hidden feature F_hidden$_{0,0}$. Also, the first kernel K$_{0,0}$ may include C$_{out}$ sub-kernels, and one sub-kernel may have a size of W$_K$×H$_K$×C$_{in}$. The number of channels of one sub-kernel may be the same as the number of channels Cin of a hidden feature.

Also, the convolution unit 720 may generate a second output feature F_out$_{0,0}$, by performing a convolution operation between the second hidden feature F_hidden$_{1,0}$ and a second kernel K$_{1,0}$ by applying the second kernel K$_{1,0}$ to the second hidden feature F_hidden$_{1,0}$. Also, the convolution unit 720 may generate an n$^{th}$ output feature F_out$_{L-1,L-1}$, by performing a convolution operation between the n$^{th}$ hidden feature F_hidden$_{L-1,L-1}$ and an n$^{th}$ kernel K$_{L-1,L-1}$, by applying the n$^{th}$ kernel K$_{L-1,L-1}$ to the n$^{th}$ hidden feature F_hidden$_{L-1,L-1}$. Also, each of the second to n$^{th}$ kernels and K$_{L-1,L-1}$ may include Cout sub-kernels, and one sub-kernel may have a size of W$_K$×H$_K$×Cin.

In this case, widths and heights of the features F_out$_{0,0}$, F_out$_{1,0}$, . . . , and F_out$_{L-1,L-1}$ output as a convolution operation result may be the same as hidden features, and the number of channels of the output features may be determined based on the number of sub-kernels included in one kernel. For example, when each of hidden features according to an embodiment has a size of W$_F$×H$_F$×C$_{in}$, and the number of sub-kernels included in one kernel is Cout, each of output N features may have a size of W$_F$×H$_F$×Cout.

Also, the pixel synthesizing unit 730 according to an embodiment may generate a second image F_out, by synthesizing the n features output from the convolution unit 720. The pixel synthesizing unit 730 may generate the second image F_out, based on a stride size L applied to a convolution operation performed by the feature extracting unit 710 to generate the hidden features F_hidden$_{0,0}$, F_hidden$_{1,0}$, . . . , and F_hidden$_{L-1,L-1}$. The pixel synthesizing unit 730 may generate the second image F_out, based on Equation 3.

For example, when the feature extracting unit 710 performs a convolution operation between the first image F_in and the kernels P$_{0,0}$, P$_{1,0}$, . . . , P$_{L-1,L-1}$ and the stride size is L, the pixel synthesizing unit 730 may divide the second image F_out into blocks having a size of L×L, and may determine pixel values included in the output features F_out$_{0,0}$, F_out$_{1,0}$, . . . , and F_out$_{L-1,L-1}$ as pixel values of pixels having the same location in the blocks, which has been described in detail with reference to FIG. 6, and thus, a detailed description will be omitted.

At least one of the feature extracting unit 710, the convolution unit 720, and the pixel synthesizing unit 730 described with reference to FIGS. 7 to 9 may be implemented as a hardware chip and may be located into an image processing apparatus. For example, at least one of the feature extracting unit 710, the convolution unit 720, and the pixel synthesizing unit 730 may be implemented as a dedicated hardware chip for artificial intelligence (AI), or may be implemented as a part of a general-purpose processor (e.g., a CPU or an application processor) or a graphics processor (e.g., a GPU) and may be loaded into the image processing apparatus 100 according to an embodiment.

Also, at least one of the feature extracting unit 710, the convolution unit 720, and the pixel synthesizing unit 730 may be implemented as a software module. When at least one of the feature extracting unit 710, the convolution unit 720, and the pixel synthesizing unit 730 is implemented as a software module (or a program module including instructions), the software module may be stored in a non-transitory computer-readable medium. Also, in this case, at least one software module may be provided by an operating system (OS) or a certain application. Alternatively, a part of at least one software module may be provided by an OS, and the remaining part may be provided by a certain application.

Figure 10:
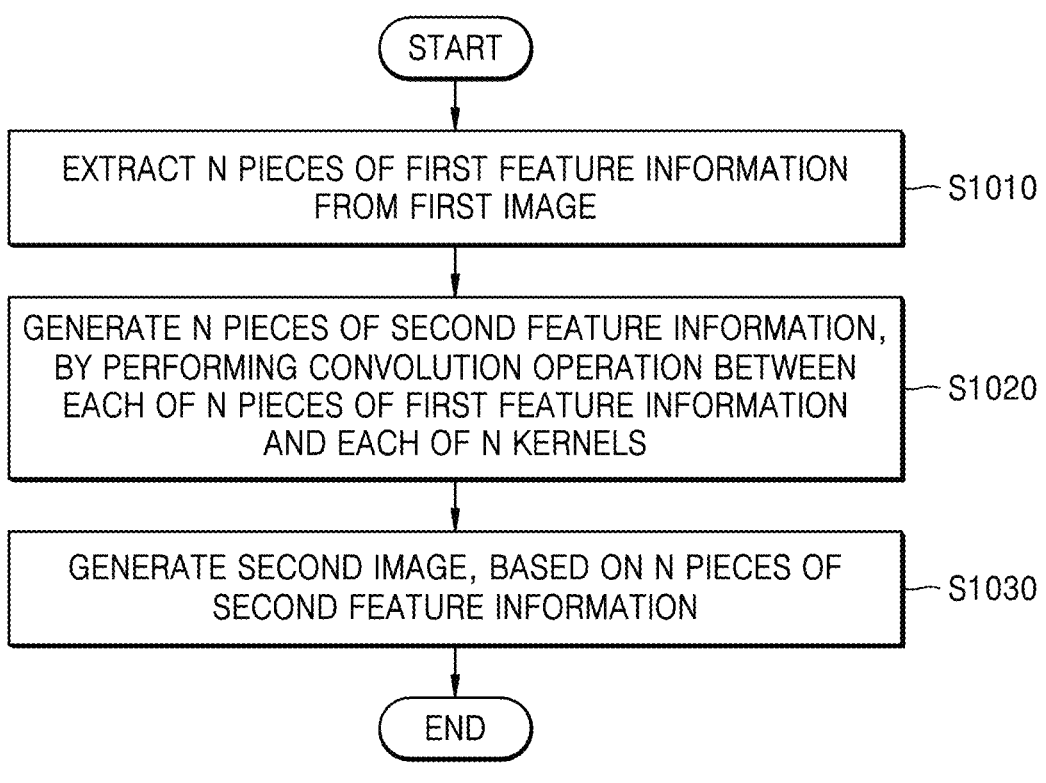
FIG. 10 is a flowchart illustrating an operating method of an image processing apparatus, according to an embodiment.

FIG. 10 is a flowchart illustrating an operating method of an image processing apparatus, according to an embodiment.

Referring to FIG. 10, the image processing apparatus 100 according to an embodiment may extract n pieces of first feature information from a first image, based on locations of pixels included in the first image (S1010).

For example, the image processing apparatus 100 may generate n sampling features, by grouping pixels, based on location information of pixels included in the first image. The image processing apparatus 100 may generate the n sampling features, by dividing the first image into blocks having a preset size of L×L and sampling pixels having the same location in the blocks as the same group. In this case, the preset size of the block (a sampling period in a width direction and a height direction) may be set in various ways. A method of generating n sampling features has been described in detail with reference to FIG. 3, and thus, a repeated description will be omitted.

Alternatively, the image processing apparatus 100 may generate n hidden features, by performing a convolution operation between the first image and kernels, by applying a stride size L. A method of generating n hidden features has been described in detail with reference to FIGS. 8 and 9, and thus a repeated description will be omitted.

The image processing apparatus 100 according to an embodiment may generate n pieces of second feature information, by performing a convolution operation between each of the n pieces of first feature information and each of n kernels (S1020).

For example, the image processing apparatus 100 may generate n output features, by performing convolution (group convolution) between each of the n sampling features generated in operation 1010 (S1010) and each of the n kernels. In this case, each of the n kernels may include Cout (number of channels of an output feature) sub-kernels, and one sub-kernel may have a size of $W_K \times H_K \times Cin$ (number of channels of a sampling feature).

Also, the image processing apparatus 100 may generate the n output features, by performing convolution (group convolution) between each of the n hidden features generated in operation 1010 (S1020) and each of then kernels. In this case, each of the n kernels may include Cout (number of channels of an output feature) sub-kernels, and one sub-kernel may have a size of $W_K \times H_K \times Cin$ (number of channels of a hidden feature).

A method of performing a convolution operation has been described in detail with reference to FIG. 5, and thus, a repeated description will be omitted.

The image processing apparatus 100 according to an embodiment may generate a second image, based on the n pieces of second feature information (S1030).

For example, the image processing apparatus 100 may generate the second image, based on a sampling period L in a width direction and a height direction used when pixels included in the first image is sampled in operation S1010.

Alternatively, the image processing apparatus 100 may generate the second image, based on a stride size L applied to a convolution operation performed to generate hidden features in operation S1010.

The image processing apparatus 100 may divide the second image into blocks having a size of L×L, and may determine pixel values included in the n output features generated in operation S1020 as pixel values of pixels having the same location in the blocks.

A method of generating the second image has been described in detail with reference to FIG. 6, and thus, a repeated description will be omitted.

Figure 11:
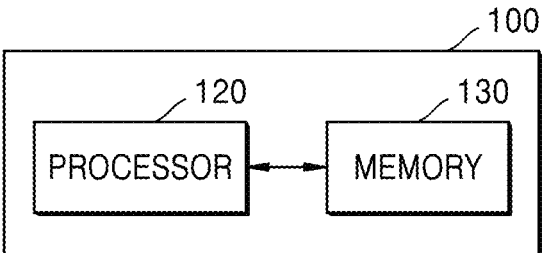
FIG. 11 is a block diagram illustrating a configuration of an image processing apparatus, according to an embodiment.

FIG. 11 is a block diagram illustrating a configuration of an image processing apparatus, according to an embodiment.

Referring to FIG. 11, the image processing apparatus 100 according to an embodiment may include a processor 120 and a memory 130.

The processor 120 according to an embodiment may control an overall operation of the image processing apparatus 100. The processor 120 according to an embodiment may execute one or more programs stored in the memory 130.

The memory 130 according to an embodiment may store various data, a program, or an application for driving and controlling the image processing apparatus 100. The program stored in the memory 130 may include one or more instructions. The program (the one or more instructions) or the application stored in the memory 130 may be executed by the processor 120.

The processor 120 according to an embodiment may include at least one of a central processing unit (CPU), a graphics processing unit (GPU), and a video processing unit (VPU). Alternatively, according to an embodiment, the processor 120 may be implemented as a system-on-chip (SoC) in which at least one of a CPU, a GPU, and a VPU is integrated. Alternatively, the processor 120 may further include a neural processing unit (NPU).

The processor 120 according to an embodiment may generate a second image from which compression artifacts are removed from a first image including compression artifacts, by using an artifact removal network including one or more convolutional neural networks.

For example, the processor 120 may perform at least one of operations of the pixel sampling unit 300, the convolution unit 400, and the pixel synthesizing unit 500 described with reference to FIGS. 2 to 6, and may perform at least one of operations of the feature extracting unit 710, the convolution unit 720, and the pixel synthesizing unit 930 described with reference to FIGS. 7 to 9. The processor 120 may extract n pieces of first feature information, based on locations of pixels included in the first image. For example, the processor 120 may divide the first image into blocks having a size of L×L, and may extract pixels having the same location in the blocks as one sampling feature. Accordingly, the processor 120 may generate n(=L×L) sampling features. Alternatively, the processor 120 may generate n hidden features, by performing a convolution operation between the first image and kernels, by applying a stride size L.

Also, the processor 120 may generate n pieces of second feature information, by performing a convolution operation between each of the n pieces of first feature information and each of n kernels.

Also, the processor 120 may generate the second image from which compression artifacts are removed, based on the n pieces of second feature information. The processor 120 may divide the second image into blocks having a size of L×L, and may determine pixel values included in the n pieces of second feature information as pixel values of pixels having the same location in the blocks.

The artifact removal network 30 according to an embodiment may be a network trained by a server or an external device. The external device may train the artifact removal network 30, based on training data. In this case, the training data may include a plurality of data sets including image data in which compression artifacts are included and image data from which compression artifacts are removed.

The server or the external device may determine weight values included in kernels used in each of a plurality of convolution layers included in the artifact removal network 30. For example, the server or the external device may determine the weight values to minimize a difference (loss information) between image data generated by the artifact removal network 30 and image data from which compression artifacts are removed as training data.

The image processing apparatus 100 according to an embodiment may receive the artifact removal network 30 whose training is completed from the server or the external device, and may store the artifact removal network 30 in the memory 130. For example, the memory 130 may store a structure and weight values of the artifact removal network 30 according to an embodiment, and the processor 120 may generate the second image from which compression artifacts are removed from the first image according to an embodiment, by using the weight values stored in the memory 130.

The block diagram of the image processing apparatus 100 of FIG. 11 is a block diagram for an embodiment. Elements of the block diagram may be integrated, added, or omitted according to specifications of the image processing apparatus 100 that is actually implemented. That is, when necessary, two or more components may be combined into one component, or one component may be divided into two or more components. Also, a function performed in each block is intended to describe embodiments, and its detailed operations or devices do not limit the scope of the disclosure.

An operating method of an image processing apparatus according to an embodiment may be implemented as program commands executable through various computer means and may be recorded on a non-transitory computer-readable medium. The computer-readable medium may include program commands, data files, data structures, and the like separately or in combinations. The program commands recorded on the computer-readable medium may be specially designed and configured for the disclosure or may be well-known to and be usable by one of ordinary skill in the art of computer software. Examples of the computer-readable recording medium include a magnetic medium such as a hard disk, a floppy disk, or a magnetic tape, an optical medium such as a compact disc read-only memory (CD-ROM) or a digital versatile disc (DVD), a magneto-optical medium such as a floptical disk, and a hardware device specially configured to store and execute program commands such as a ROM, a random-access memory (RAM), or a flash memory. Examples of the program commands include advanced language code that may be executed by a computer by using an interpreter or the like as well as machine language code made by a compiler.

Also, an image processing apparatus and an operating method of the image processing apparatus according to disclosed embodiments may be provided in a computer program product. The computer program product is a product purchasable between a seller and a purchaser.

The computer program product may include an software program and a computer-readable storage medium in which the software program is stored. For example, the computer program product may include a software program-type product (e.g., a downloadable application) electronically distributed through a manufacturer of an electronic device or an electronic market (e.g., Google Play™ store or App Store). For electronic distribution, at least a portion of the software program may be stored in a storage medium or temporarily generated. In this case, the storage medium may be a storage medium of a server of the manufacturer, a server of the electronic market, or a relay server that temporarily stores the software program.

The computer program product may include a storage medium of a server or a storage medium of a client device in a system including the server and the client device. Alternatively, when there is a third device (e.g., a smartphone) communicating with the server or the client device, the computer program product may include a storage medium of the third device. Alternatively, the computer program product may include a software program itself transmitted from the server to the client device or the third device or from the third device to the client device.

In this case, one of the server, the client device, and the third device may execute a method according to disclosed embodiments by executing the computer program product. Alternatively, at least two of the server, the client device, and the third device may execute a method according to disclosed embodiments in a distributed fashion by executing the computer program product.

For example, the server (e.g., a cloud server or an AI server) may execute the computer program product stored in the server, and may control the client device communicating with the server to perform a method according to disclosed embodiments.

Although the embodiments have been described in detail above, the scope of the disclosure is not limited thereto, and various modifications and improvements made by one of ordinary skill in the art by using the basic concept of the disclosure defined by the claims are also within the scope of the disclosure.

What is claimed is:

1. An image processing apparatus comprising:
memory storing instructions; and
at least one processor,
wherein the instructions, when executed by the at least one processor, cause the image processing apparatus to use at least one neural network to:
extract n pieces of first feature information from a first image, based on locations of pixels included in the first image, wherein n is a positive integer, by:
dividing, prior to performing a convolution operation on the first image, the first image into a first plurality of blocks having a variable size, that is preset before extraction, based on the following equation:

$$F_{in}^{u,v} = F_{in}[u:L:W-1:v:L:H-1, 0:1:C-1]$$

where $$F_{in}^{u,v}$$

denotes a sampling feature, $F_{in}$ denotes the first image having a width W, a height H, and C channels, u:L:W−1 denotes sampling of pixels with a preset sampling period L in a width direction from position u to position W−1, v:L:H−1 denotes sampling of pixels with the preset sampling period L in a height direction from position v to position H−1, and 0:1:C−1 denotes sampling of all pixels across the C channels, such that a plurality of corresponding sampling pixels have a same location among the first plurality of blocks, the plurality of corresponding sampling pixels have different locations in the first image, and the plurality of corresponding sampling pixels are assigned a same group from among n groups, and
generating the n pieces of first feature information such that the n pieces of first feature information correspond to the n groups,
based on the n pieces of first feature information being extracted from the first image, generate n pieces of second feature information by performing a convolution operation between each of the n pieces of first feature information and each of n kernels, and
generate, based on the n pieces of second feature information, a second image from which compression artifacts included in the first image are removed.
2. The image processing apparatus of claim 1, wherein each of the first plurality of blocks comprises n pixels, and wherein n is determined based on the variable size that is preset before extraction.
3. The image processing apparatus of claim 1, wherein the instructions, when executed by the at least one processor, cause the image processing apparatus to use the at least one neural network to:

divide the second image into a second plurality of blocks having the variable size that is preset before extraction, and determine pixel values included in one piece of second feature information, among the n pieces of second feature information, as pixel values of a same location in the second plurality of blocks.

4. The image processing apparatus of claim 1, wherein the instructions, when executed by the at least one processor, cause the image processing apparatus to use the at least one neural network to extract the n pieces of first feature information, by performing a first convolution operation between the first image and a second kernel, by applying a stride size.

5. The image processing apparatus of claim 4, wherein n is determined based on the stride size.

6. The image processing apparatus of claim 1, wherein the n kernels are different from each other.

7. The image processing apparatus of claim 1, wherein a size of the first image and a size of the second image are the same.

8. An operating method of an image processing apparatus for performing image processing by using at least one neural network, the operating method comprising:

extracting n pieces of first feature information from a first image, based on locations of pixels included in the first image, wherein n is a positive integer, by:

dividing, prior to performing a convolution operation on the first image, the first image into a first plurality of blocks having a variable size, that is preset before extraction, based on the following equation:

$$F_{in}^{u,v} = F_{in}[u:L:W-1:v:L:H-1,0:1:C-1]$$

where $$F_{in}^{u,v}$$

denotes a sampling feature, Fin denotes the first image having a width W, a height H, and C channels, u:L:W−1 denotes sampling of pixels with a preset sampling period L in a width direction from position u to position W−1, v:L:H−1 denotes sampling of pixels with the preset sampling period L in a height direction from position v to position H−1, and 0:1:C−1 denotes sampling of all pixels across the C channels, such that a plurality of corresponding sampling pixels have a same location among the first plurality of blocks, the plurality of corresponding sampling pixels have different locations in the first image, and the plurality of corresponding sampling pixels are assigned a same group from among n groups; and generating the n pieces of first feature information such that the n pieces of first feature information correspond to the n groups;

based on the n pieces of first feature information being extracted from the first image, generating n pieces of second feature information, by performing a convolution operation between each of the n pieces of first feature information and each of n kernels; and generating, based on the n pieces of second feature information, a second image from which compression artifacts included in the first image are removed.

9. The operating method of claim 8, wherein each of the first plurality of blocks comprises n pixels, and wherein n is determined based on the variable size that is preset before extraction.

10. The operating method of claim 8, wherein the generating the second image comprises:

dividing the second image into a second plurality of blocks having the variable size that is preset before extraction; and determining pixels included in one piece of second feature information, among the n pieces of second feature information, as pixel values of a same location in the second plurality of blocks.

11. The operating method of claim 8, wherein the extracting the n pieces of first feature information comprises extracting the n pieces of first feature information, by performing a first convolution operation between the first image and a second kernel, by applying a stride size.

12. The operating method of claim 11, wherein n is determined based on the stride size.

13. A computer program product comprising a non-transitory computer-readable recording medium having recorded thereon a program for executing an operating method of an image processing apparatus for performing image processing by using at least one neural network, the operating method comprising:

extracting n pieces of first feature information from a first image, based on locations of pixels included in the first image, wherein n is a positive integer, by:

dividing, prior to performing a convolution operation on the first image, the first image into a first plurality of blocks having a variable size, that is preset before extraction, based on the following equation:

$$F_{in}^{u,v} = F_{in}[u:L:W-1:v:L:H-1,0:1:C-1]$$

where $$F_{in}^{u,v}$$

in denotes a sampling feature, $F_{in}$ denotes the first image having a width W, a height H, and C channels, u:L:W−1 denotes sampling of pixels with a preset sampling period L in a width direction from position u to position W−1, v:L:H−1 denotes sampling of pixels with the preset sampling period L in a height direction from position v to position H−1, and 0:1:C−1 denotes sampling of all pixels across the C channels, such that a plurality of corresponding sampling pixels have a same location among the first plurality of blocks, the plurality of corresponding sampling pixels have different locations in the first image, and the plurality of corresponding sampling pixels are assigned a same group from among n groups; and generating the n pieces of first feature information such that the n pieces of first feature information correspond to the n groups;

based on the n pieces of first feature information being extracted from the first image, generating n pieces of second feature information, by performing a convolution operation between each of the n pieces of first feature information and each of n kernels; and generating, based on the n pieces of second feature information, a second image from which compression artifacts included in the first image are removed.

14. The computer program product of claim 13, wherein each of the first plurality of blocks comprises n pixels, and wherein n is determined based on the variable size that is preset before extraction.

15. The computer program product of claim 13, wherein the generating the second image comprises:

dividing the second image into a second plurality of blocks having the variable size that is preset before extraction; and determining pixels included in one piece of second feature information, among the n pieces of second feature information, as pixel values of a same location in the second plurality of blocks.

16. The computer program product of claim 13, wherein the extracting the n pieces of first feature information comprises extracting the n pieces of first feature information, by performing a first convolution operation between the first image and a second kernel, by applying a stride size.

17. The computer program product of claim 16, wherein n is determined based on the stride size.

18. The image processing apparatus of claim 1, wherein the variable size that is preset before extraction is determined based on (i) the sampling period in the width direction and the height direction and (ii) at least one of: whether line-based processing is applied to the first image, whether de-interlacing is applied to the first image, or compression parameters encoded in the first image.

* * * * *